Jan. 17, 1933.  G. H. BEUOY  1,894,480
ROTARY ENGINE
Filed Dec. 19, 1929   5 Sheets-Sheet 1
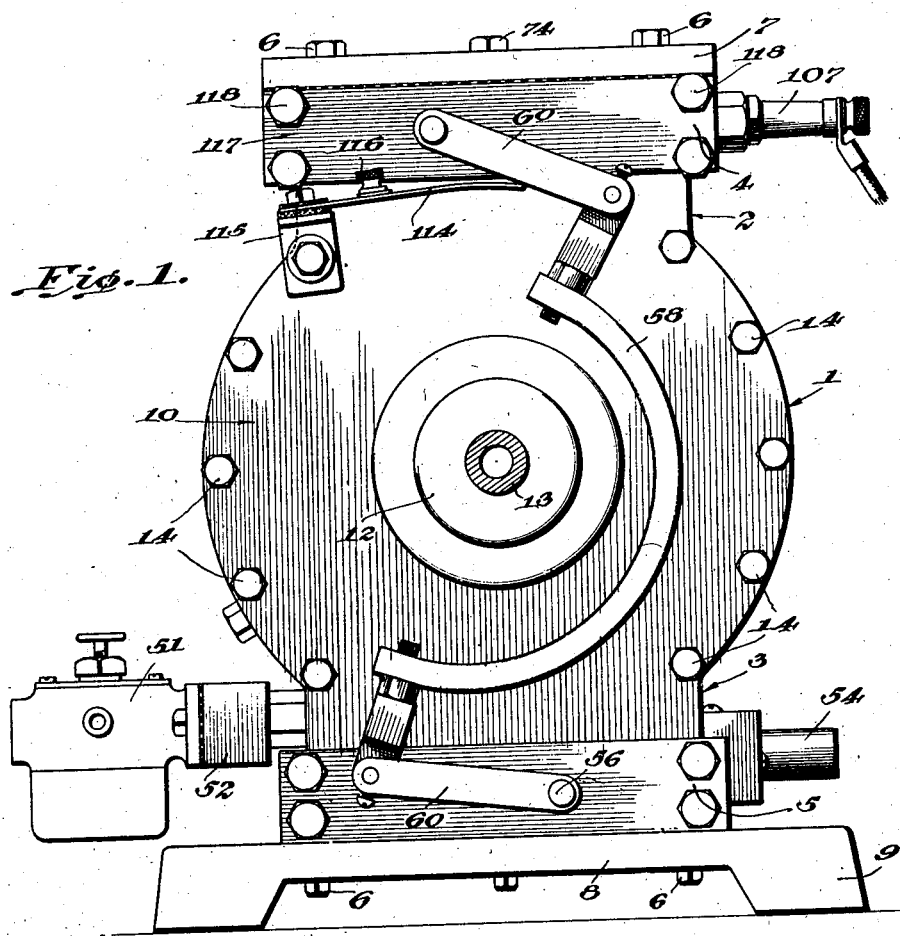
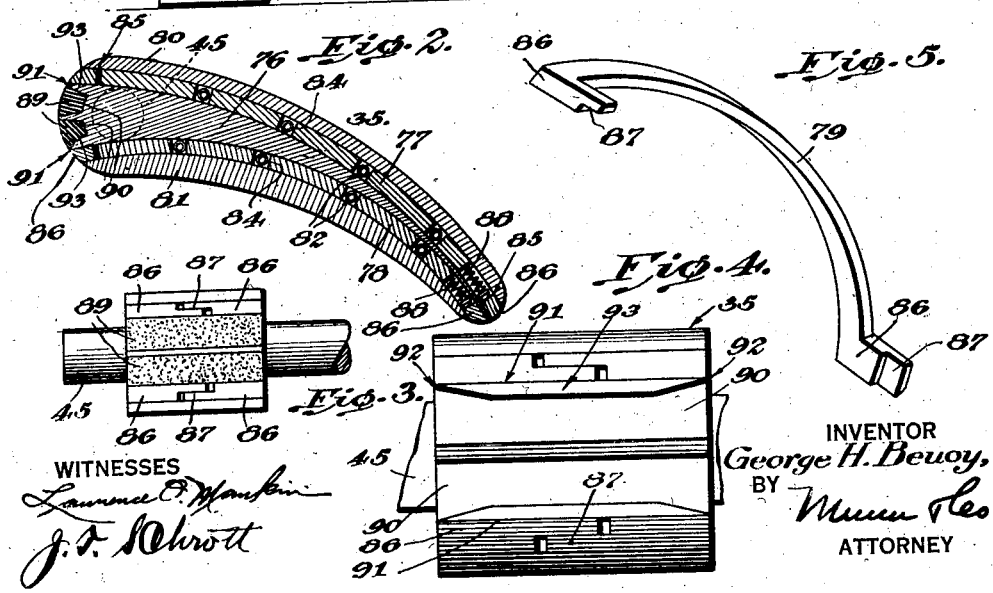
WITNESSES
INVENTOR
George H. Beuoy,
BY
ATTORNEY Jan. 17, 1933.  G. H. BEUOY  1,894,480
ROTARY ENGINE
Filed Dec. 19, 1929   5 Sheets-Sheet 2
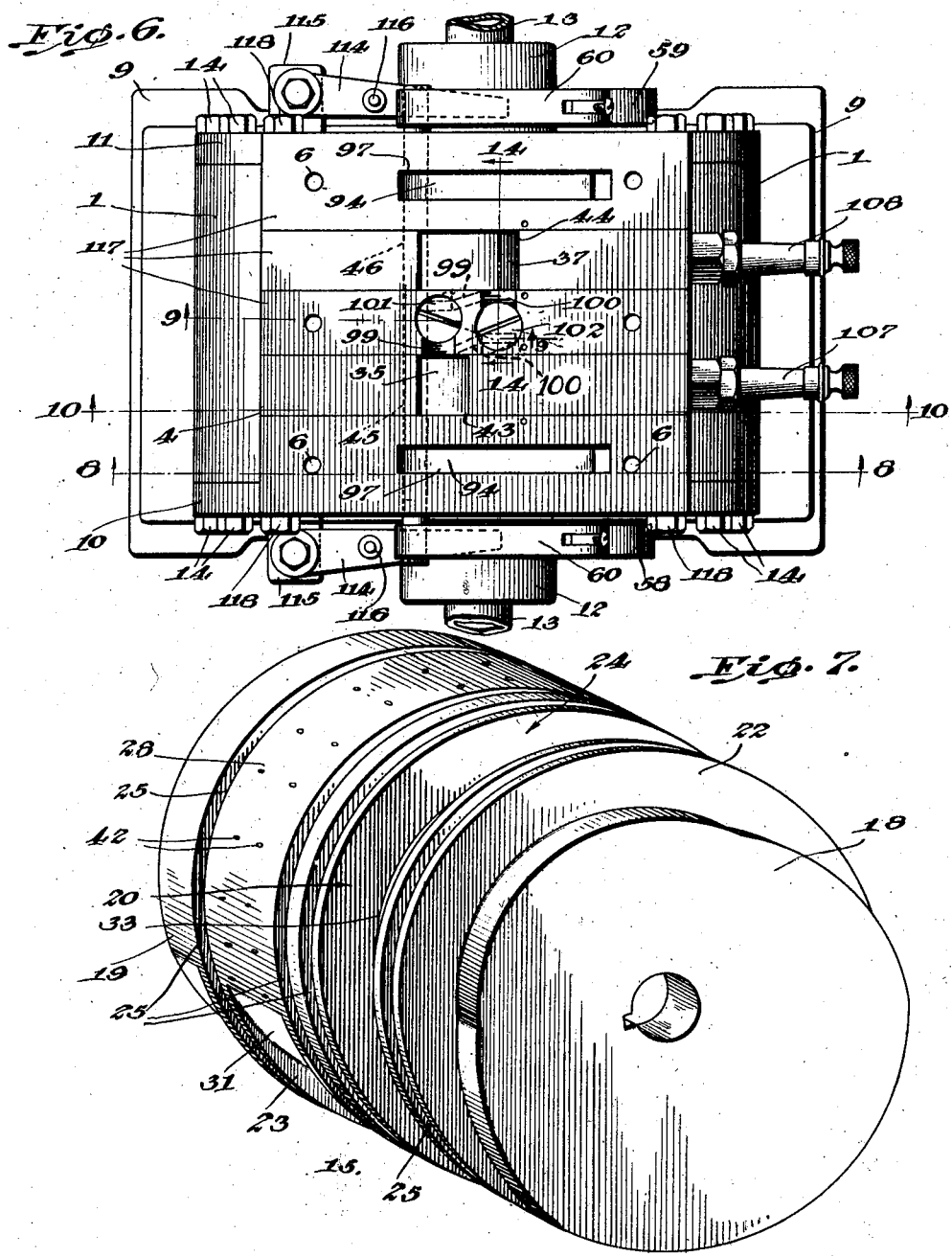
WITNESSES
INVENTOR
George H. Beuoy,
BY
ATTORNEY

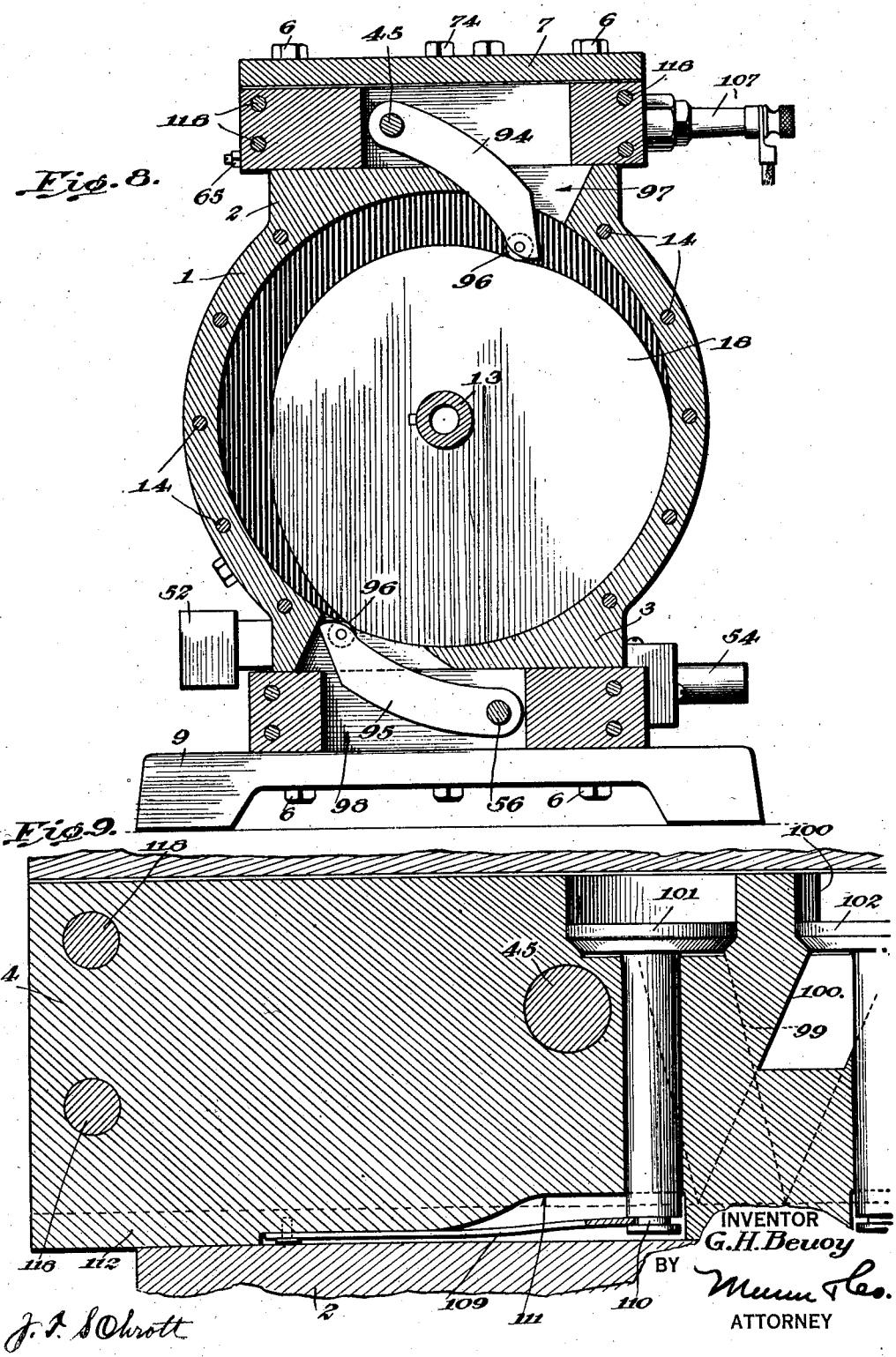

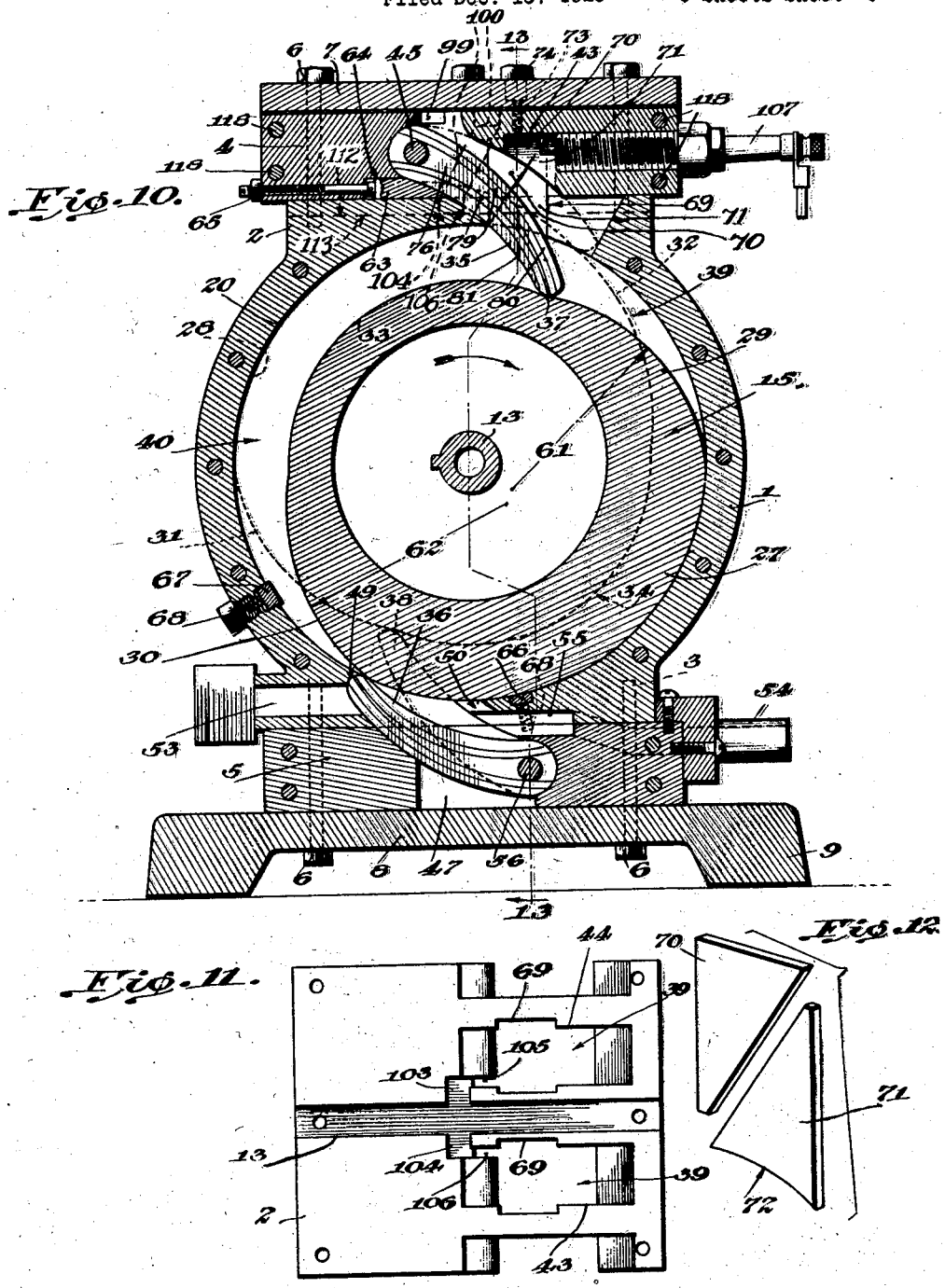

Jan. 17, 1933.  G. H. BEUOY  1,894,480
ROTARY ENGINE
Filed Dec. 19, 1929  5 Sheets-Sheet 5
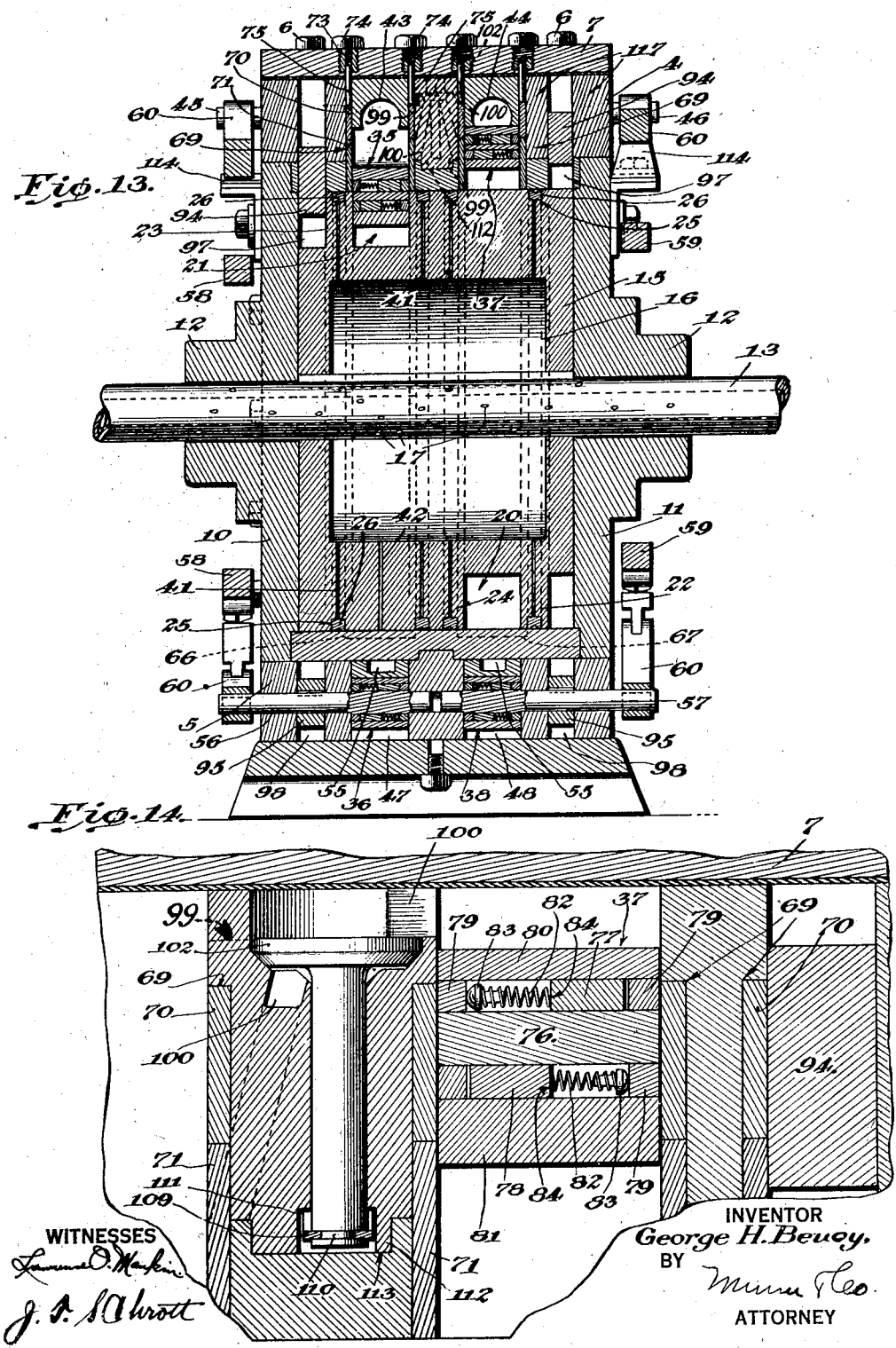
INVENTOR
George H. Beuoy,
BY
ATTORNEY
WITNESSES

Patented Jan. 17, 1933

1,894,480

UNITED STATES PATENT OFFICE

GEORGE H. BEUOY, OF CEDAR VALE, KANSAS

ROTARY ENGINE

Application filed December 19, 1929. Serial No. 415,306.

This invention relates to improvements in rotary engines, and it consists of the constructions, combinations and arrangements herein described and claimed.

An object of the invention is to provide a rotary engine, in the simplest form of which the ignition of one charge and the expulsion or transfer of another charge of combustible fluid are acts of simultaneous occurrence on one side of the engine, the aforesaid expulsion occurring into a compression chamber on the other side of the engine in which the charge is compressed by said act of expulsion and whence it is delivered to the respective firing chamber for subsequent ignition.

Another object of the invention is to provide a rotary engine in which there is a mutual coaction between a pair of chambers by virtue of one serving the other with a compressed combustible fluid, to which end the expulsion head operable in the expulsion chamber on one side of the engine delivers a previously drawn in charge of the fluid to the compression chamber on the other side of the engine to await delivery into the firing chamber on the same side until the force of an ignited charge has spent itself against the firing head of the first side, said charge having previously been delivered and compressed by the expulsion head on said other side.

A further object of the invention is to provide in a rotary engine a rotor having an enlargement with cam ends which constitute the firing and expulsion heads, said cam ends being struck on such arcs of circles that the leading edges of a pair of pivoted and connected co-acting abutments will follow the surface with perfect fidelity so that fluid cannot leak past in either direction.

A still further object of the invention is to provide in a rotary engine a guide means for the aforesaid abutments so that the leading edges will not bear on the peripheral surface of the rotor with undue pressure yet insure that contact necessary to prevent the leakage mentioned.

A still further object of the invention is to equip both the swinging abutments and portions of the stator with compression holding means so that there may be no leakage of fluid in any direction either around the abutments or past the components of the rotor revolving in the working chamber.

Other objects and advantages will appear in the following specification, reference being had to the accompanying drawings in which Figure 1 is an end elevation of the improved rotary engine.

Figure 2 is a longitudinal section of one of the swinging abutments.

Figure 3 is an elevation of the heel of the abutment, particularly illustrating the combination of metallic and fibrous packing.

Figure 4 is an elevation of said heel particularly illustrating the knife edge formation of the slots for the fibrous packing.

Figure 5 is a perspective view of one of the metallic packing elements.

Figure 6 is a plan view of the engine, the cover plate being omitted.

Figure 7 is a perspective view of the rotor.

Figure 8 is a vertical section taken on the line 8—8 of Figure 6, illustrating the guide means previously mentioned.

Figure 9 is a detail section taken on the line 9—9 of Figure 6, particularly illustrating the cross-over ports and the valves which control them.

Figure 10 is a vertical section taken on the line 10—10 of Figure 6, showing the relationship of a connected pair of abutments with the firing and expulsion heads of the rotor on one side of the engine.

Figure 11 is a detail plan view of the stator alone.

Figure 12 is a perspective view of a pair of the compression holding members mentioned before.

Figure 13 is a vertical longitudinal section taken substantially on the line 13—13 of Figure 10.

Figure 14 is a detail sectional view taken on the line 14—14 of Figure 6.

In carrying out the invention provision is made of a stator 1 which, in the simplest form of the invention illustrated, has diametrically opposite bases 2 and 3 to which heads 4 and 5 are suitably secured, for example by means of stud bolts 6 which also serve in common to secure the cover plates 7 and 8. It is observed in Figures 1, 8 and 10 that the cover plate 8 may be provided with lateral extensions 9 furnishing the engine with a base. However, there will be many practical applications of the engine, for example use in an automobile when these extensions will not be needed and the cover plate 8 will be a duplicate of the cover plate 7.

The showing of the pair of opposed bases 2, 3 and heads 4, 5 is not to be construed as a limitation of the number of these elements capable of embodiment in the engine. In practice as many pairs may be built in as the size of the engine will permit or the power requirements may demand. For instance, the engine illustrated might be made with three pairs of opposed bases and heads.

End plates 10 and 11 (Fig. 13) have hubs 12 in which a hollow shaft 13 has sole bearing. The end plates are suitably secured to the stator, for example by means of stud bolts 14 (Fig. 1) and are adapted to be removed when required.

A rotor, generally designated 15 (Fig. 13) is secured to the shaft 13 in such a way that the shaft will always turn with the rotor.

The rotor is hollow at 16 to form a chamber to contain a liquid which will serve the double purpose of lubrication and cooling. The hollow shaft 13 may be connected in any suitable manner with a source of supply of the liquid, and for the purpose of filling the chamber 16 the shaft has a plurality of openings 17 (Fig. 13) at which the liquid is discharged.

At its opposite ends the rotor 15 (Fig. 7) has guide cams 18, 19 which are positioned 180 degrees apart and with the exception of thickness are the exact counterparts of those peripheral portions of the rotor defining parts of the working chambers 20, 21 and situated between the end and central flanges 22, 23 and 24.

These flanges are grooved in the circumferential direction as at 25 to receive metallic rings 26 (Fig. 13) much on the order of ordinary piston rings and when the rotor 15 is fitted in place in the stator 1 it is the insides of the flanges 22, 23 and 24 as well as those portions of the stator 1 appearing therebetween that form the working chambers 20, 21.

Reverting to the counterparts of the guide cams 18, 19 it is to be observed in Figure 10 that these comprise enlargements 27, 28 which in the instance of the working chamber 20 terminate in cams 29, 30 respectively constituting firing and expulsion heads and in the instance of the working chamber 21 terminate in cams 31, 32 also constituting firing and expulsion heads.

These cams, in turn, merge with depressed portions 33, 34 of the enlargements and it is in these spaces that the bearing of the leading edges of pairs of abutments 35, 36 and 37, 38 (Fig. 10) divide the respective working chambers 20, 21 into what are herein known as firing chambers 39 and expulsion chambers 40.

Liquid for example oil, is supplied to the ring grooves 25 (Figures 7 and 13) by ducts 41 which lead from the chamber 16. Similar ducts 42 terminate at the faces of the enlargements 27, 28. The centrifugal action occurring upon the revolution of the rotor forces the oil out of the ducts 41, 42 to the various surfaces bearing against the inside of the stator, thus providing a very effective force-feed oil system without any complication of parts.

There are chambers 43, 44 (Figures 10 and 13) in the head 4 in which the abutments 35, 37 swing upon integral shafts 45, 46 (Figure 6). The chambers 43, 44 are actually extensions or continuations of the firing chambers 39 of the stator, the abutments 35, 37 separating the firing chambers from the expulsion chambers 40 as already indicated.

Chambers 47, 48 (Figures 10 and 13) in the head 5 contain the abutments 36, 38, the abutments extending through continuations of the chambers 47, 48 in the stator 1 thus dividing these extensions into what are herein designated intake and exhaust ports 49, 50 (Figure 10).

A carbureter 51 (Figure 1) has connection with a manifold 52 from which independent intake passages 53 (Figure 10) lead to the intake ports 49 which correspond in shape and position on each side of the engine. On a similar principle an exhaust pipe 54 (Figure 10) has communication with the exhaust ports 50 by means of conduits 55 formed partly in the base 3 and head 5.

Separate shafts 56, 57 (Figure 13) are made integrally with the abutments 36, 38. The pairs of abutments 35, 36 and 37, 38 on opposite sides of the engine are made to work in unison or in other words are made to swing simultaneously upon the respective shafts by means of yokes 58, 59 (Figures 1 and 6), connected with arms 60 attached to the ends of the various shafts.

It is essential that the contact of the various elements with the side and bottom walls of the working chambers 20, 21 shall be such as to prevent the leakage of fluid in either direction, this being especially true of the points of contact of the leading edges of the abutments with the peripheral surfaces of the enlargements 27, 28. It has been found in practice that the radius 61 (Figure 10) upon which the arc of the firing head 29 is struck must be somewhat shorter than the radius 62 upon which the arc of the expulsion head 30 is struck in order that the abutments 35, 36 for example, may work in perfect synchronism and maintain a perpetual leading edge contact.

The reason for the difference in the arcuate formations of the two cams is that the leading edge of the abutment 35 always travels over the face of the firing head 29 with a downward or inward motion respecting the axial center of the engine while the abutment 36 always travels over the face of the expulsion head 30 with an outward motion. In the actual construction of one size of the engine it was demonstrated that the radius 61 should be 3 9/32" while radius 62 should be 3 20/32" in order to obtain an identical diametrical dimension at every conceivable point across the axis of the rotor, there having been no indication whatever of a leakage of fluid from one chamber to another, whereas when tried with equal radii it was found impossible to maintain a continuous contact when turning the engine over. From this it will be understood that the principle of identical diametrical dimension must be common to all sizes of engines of this type. Inasmuch as the cams are equal at every diametrical point, it follows that a drop in one cam is equal to the rise in the other cam per unit of rotation. This result is of course augmented by packing means with which the abutments are equipped, a description of this means being embodied below.

Each of the abutments 35, 37 has a seat 63 (Figure 10) adjoining its heel, the purpose of the seat being to support the heel and prevent the likelihood of the leading edge of the abutment under force of an explosion from bearing on the rotor surface so hard as to act as a brake against free rotation. The seat 63 is slidable in and out in recess 64 in the head 4 by means of an adjustment 65. Should it be found that the force of the explosions against the abutment 35 have any tendency of pressing the leading edge against the periphery of the enlargement 27 with undue pressure the seat 63 may be given a slight inward adjustment until the condition is relieved.

Packing strips 66, 67 (Figures 10 and 13) are so situated in recesses in the stator 1 at each side of the engine that springs 68, also fitted in the recesses, can press them against the peripheries of the end flanges 22, 23 and central flange 24. The packing strips are coextensive with the distance between the rings 26, the purpose of the packing strips being to hold compression so that in respect to the strip 66 the expanding working charge cannot escape into the exhaust port 50 until the firing head 29 passes the port and in respect to the strip 67 the fresh charge cannot leak back when under the force of expulsion and compression.

At this point it may not be amiss to state that the engine although of the internal combustion type as herein contemplated, is admirably adaptable as a steam engine. Of course when so used there would be no need either for the carburetor 51 or its intake passages 53 in the stator 1. Slide valves of a conventional order would be incorporated in the heads 4 and 5 and an exhaust conduit similar to the conduit 55 would be situated at a diametrically opposite point. In such case the packing strip 67 would have to be moved up to a point diametrically opposite to the strip 66.

The sides of those parts of the firing chambers 39 that extend into the base 2 of the stator 1 (Figures 10 and 11) as well as the chambers 43, 44 in the head 4 are channeled at 69 to receive pairs of compression holding members 70, 71 (Figures 10 and 12). These comprise flat strips of metal substantially equal in thickness to the depth of the channels and are of substantially triangular shape so that a wedge action may be set up for the purpose of augmenting the function of the rings 26 in sealing the compression and firing chambers.

To this end the base of each member 71 is concaved at 72 on a curvature agreeing with that of the rotor flange against which it bears and since the tendency of the rotor is to carry the members 71 around with it during the course of rotation the arrangement of the wedge is such that the small ends of the members 70 confront the rotor while the large ends or bases of the members 71 are made to bear on the rotor flanges as already stated.

Springs 73 (Figures 10 and 13), pocketed in the bores of cap screws 74 which also receive pins 75 loosely bearing on the members 70, exert pressure on the members 70 and serve not only to seal the joint between the members but also the joints at the sides of the channels 69 as well as the joint where the members 71 bear on the rotor flanges.

Were it not for these compression holding members 70, 71 it would be impossible to hold the expanding fluid in the firing chamber 39 against leakage at the rear of that part of the chamber in the base 2 into the expulsion chamber 40. It is by virtue of the bias cut between the members 70, 71 which gives these members the wedge shape mentioned, that it is possible to make a single spring perform a simultaneous sealing action in three directions, namely at the two sides of each channel 69 and against the face of the particular rotor flange against which the member 71 happens to be bearing.

While on the subject of the packing for the engine it is believed that the packing means of the abutments should be described. The abutments are also of a particular construction and since they are all alike the description of one will suffice. The shaft 45, using the abutment 35 as an example, is made integrally with a core 76 (Figures 2 and 14). Situated on opposite sides of this core are filler plates 77, 78 the opposite edges of which are confronted by arcuate packing members 79 (Figure 5). Cover strips 80, 81 respectively above and below the filler plates 77, 78 generally complete the abutment.

The filler plates 77, 78 and cover strips 80, 81 are suitably secured to the core 76 so as to make a solid construction. Although it would be possible to machine the abutment from a solid piece of metal there is a very definite purpose in making the foregoing parts separately and then securing them together. It is to be observed in Figure 2 that the opposite sides of the filler plates 77, 78 are concentric. Thes plates are manufactured by first making cylinders or parts thereof of the proper internal and external diameters and then cutting therefrom a succession of segments which will compose the curved filler plates.

A similar method will be employed in the instance of the core 76 and the cover strips 80, 81. The respective parts of cylinders of which these elements are made will have to be cut eccentrically in order that the abutment may assume the curved tapering shape illustrated. This description exemplifies only one mode of manufacturing the abutment but in practice the parts may be drop-forged or made according to any known practice.

The springs 82 (Figure 14) press against the filler plates 77, 78 and ball-headed pin 83 which in turn bear against the arcuate packing members 79 to keep the latter pressed against the sides of the chamber in which the abutment swings. The springs are seated in notches or kerfs 84 cut into the filler plates from the opposite edges.

In looking down on one of the filler plates one would see the notches 84 cut in from opposite edges a distance approximately one-half the width of the plate. The notches are staggered so that there is not the danger of weakening the plate which would occur if the notches were placed directly opposite each other. The spaces which the filler plates 77 78 define are continued around the heel and leading edge of the abutment and are there designated 85 for the purpose of identification.

Lugs 86 (Figure 5) extending at right angles to each arcuate packing member 79, occupy these spaces, the confronting ends of the lugs being rabbeted at 87 to provide overlapping tongues which make a very complete joint. Springs 88, bearing against the ends of the filler plates and against the lugs 86 preferably at the leading edge of the abutment, serve to keep the lugs 86 pressed outwardly so that a good joint may be made at the point of contact of the abutment with the rotor surface.

It will be understood at once that each arcuate packing member 79 is capable of motion in two directions. The first of these is lateral under the influence of the springs 82 (Figures 2 and 14), by virtue of which a good contact is made with the adjacent side of the chamber. The second of these occurs by force of the springs 88 which tend to move the arcuate packing member in the circular direction.

The heel of the abutment carries one or more (preferably two) fibrous packings 89. The fibrous packing has been found especially advantageous in engines of small size and is especially necessary on the heel of the abutment to prevent any leakage of fluid past the adjoining lugs 86 of the arcuate members 79. Since the springs 88 tend to move these members toward the leading edge of the abutment it follows that the upper lugs 86 are likely to be depressed below the surface of the heel, hence it is necessary to augment the function of the members 79 by fitting the heel with the fibrous packings 89.

These packings are retained by shaping the opposite sides of the slots 90 (Figures 2 and 4) into knife edges 91, 92, the former being on top of the heel and the latter extending along the sides. The formation of the knife edges necessitates a bevelling of the opposite sides of the slots at 93, the enlargement of the slots thus formed providing room in which the outer portions of the packings can expand. The constriction of the bottoms of the slots is sufficient to hold the packings in place.

Reverting to the guide cams 18, 19, it is to be observed in respect to the cam 18 (Figure 8) which is the exact duplicate of the cam 19 on the other side of the engine, that the shafts 45 and 56 of the abutments 35, 36 have levers 94, 95 (Figure 8) the free ends of which may either be equipped with rollers 96 or not, depending upon the size of the engine. In larger engines the use of rollers is deemed preferable.

The ends of the levers 94, 95 or the rollers 96 in case these are used, ride on the periphery of the guide cams 18, 19 and thus produce the swinging motion of the attached abutments inside of the working chambers. It has been brought out already that the connecting yokes 58, 59 (Figures 1 and 6) so tie these parts together that there will be synchronous motion. The purpose of the guide cams and levers 94, 95 is to relieve the undue wear of the leading edges of the various abutments which would occur were the engagement of these with the periphery of the rotor depended upon to cause the necessary inward and outward motions.

Chambers 97, 98 (Figure 8), situated in the stator bases 2, 3 and extending into the heads 4, 5 and further agreeing somewhat with the chambers 39, 47, contain the levers 94, 95. Since these chambers are situated within the confines of the stator it follows that the important bearing surfaces at the points of engagement of the levers 94, 95 with the guide cams are not likely to become fouled by foreign matter.

To the same end the arms 60, (Figure 1) and connecting yokes 58, 59 might also be enclosed either by providing the stator with some kind of a cover or so extending the housing as to embrace these parts and enclose them entirely by applying a suitable cover plate. This particular enclosure is not illustrated since its use is optional and may readily be supplied if wanted.

Mention has been made of the two sides of the engine. This is an indirect reference to the working chambers 20, 21 which are divided from each other by the central flange 24. It has also been briefly brought out before that a charge formed on one side of the engine, for example in the working chamber 20, is transferred to the other side for ignition only to have the other side of the engine to perform a similar operation for the first side, in other words, to have a charge formed in the working chamber 21 transferred to the first side for ignition in the near firing chamber 39.

This dual and cooperative function of the working chambers of the engine requires the use of cross-over ports 99, 100 (Figures 6, 9 and 14). The ports 99, 100 are formed in the head 4 and are respectively controlled by valves 101, 102 which function largely as check valves, preventing any back flow of pressure fluid.

The lower ends of the cross-over ports 99, 100 are flush with the bottom of the head 4 but communicate with inlet depressions 103, 104 (Figure 11) in the base 2 of the stator 1. These depressions have channels 105, 106 which communicate directly with the respective working chambers 21, 20 but more specifically with the firing chambers 39.

It is easy to visualize the position of the cross-over ports. A fresh charge expelled from the expulsion chamber 40 on the far side of the engine will enter the channel 105 and inlet depression 103 (Figure 11), then pass through the cross-over port 99 (Figure 9), past the valve 101 into the extension 99 of the cross-over port (Figure 9), thence into the firing chamber 39 (Figure 10) in readiness for ignition by one of a pair of spark plugs 107, 108. On the same principle, a fresh charge expelled from the expulsion chamber 40 on the near side of the engine will escape at the channel 106 into the depression 104, flow through the communicating cross-over port 100 (Figure 9), past the valve 102 and through the extension 100 of the cross-over port (Figure 6) into the firing chamber 39 on the far side of the engine in readiness for ignition by the other one of the spark plugs.

Seating of the valves 101, 102 is insured by a spring which may be arranged in any desired way, the type shown herein for illustration comprising a leaf spring 109 (Figure 9) which has an end in the form of a crotch to occupy a groove 110 near the end of the stem of the respective valve. The springs 109, of which there obviously must be two, occupy recesses 111 in a rib 112 on the underside of the head 4 and running crosswise of the engine. This rib occupies a corresponding slot 113 on top of the base 2 of the stator and when positioned therein defines a partition between the inlet depressions 103, 104 (Figure 11).

Timing of the ignition is accomplished by a pair of contactor springs of which both are partially shown in Figure 13 and one entirely shown in Figure 1. The leaf spring 114 has an insulated mounting on a bracket 115 and carries a binding screw 116 to which is connected a wire forming part of the conventional ignition circuit. A circuit is completed through the spark plug 107, for example, upon engagement of the arm 60 with the contactor 114. An advantage of this type of circuit closure is that the contacting surface of the arm 60 will always be kept bright and clean by the scraping action of the spring 114.

For the purpose of simplifying the construction of the head 4 this is composed of a plurality of sections 117 clearly shown in Figures 6 and 13. By making the head in sections it is much easier and cheaper to form the various openings which occur in the sections than it would be to machine the head in one solid piece. Moreover, any damage to one of the sections will merely mean the replacement of that particular section and not the loss of the entire head. The sections are tightly secured either by bolts 118 or some other suitable means.

The operation is readily understood. The enlargements 27, 28 (Figures 7 and 10) are 180 degrees apart and situated on opposite sides of the engine, that is to say the enlargement 27 is situated in the working chamber 20 on the near side while the enlargement 28 is situated in the working chamber 21 on the far side, it being remembered that the circular flange 24 defines a central division which makes it possible to identify the near and far sides of the engine as such.

Consider the position of the rotor as shown in Figure 10. The near expulsion chamber contains a fresh charge which was previously drawn in by action of the firing head 29 while the abutment 36 was still in the inward position against the depressed portion 33 of the rotor. At the particular period now illustrated the firing head has advanced beyond the abutment 35 so that it no longer causes a suction in the expulsion chamber 40. The abutment 36 has also been moved to the outer position where it closes the intake passage 53.

As the expulsion head 30 advances in the clockwise direction indicated the charge is expelled at the channel 106 and at inlet depression 104 (Figure 11) into the crossover port 100 (Figure 9) past the valve 102 and through the extension 100 of the port (Fig. 6) into the firing chamber 39 on the far side of the engine in which chamber the charge has thus been compressed.

While this is happening, the diametrically opposite and corresponding expulsion head 32 on the far side of the engine has about just completed the expulsion of a charge from the chamber 40 on the far side, through channel 105 and inlet depression 103 (Figure 11) cross-over port 99 (Figures 9 and 10) and compression in the near firing chamber 39.

The position of the abutment 35 is shown as it appears at the approximate instant of ignition of this compressed charge. The expanding charge exerts its pressure against the near firing head 29 (Figure 10), driving the rotor 15 in the clockwise direction and causing the previously mentioned expulsion of the charge from the expulsion chamber 40 by means of the head 30.

The firing head 29 continues to advance by virtue of the expansion of the working charge behind it until the exhaust port 50 is reached. This port, incidentally, is not controlled by the abutment 36 as far as opening and closing is concerned, and as soon as the firing head 29 advances far enough an immediate discharge of the exhaust gas occurs. Approximately at the same time the charge previously compressed into the firing chamber 39 on the far side of the engine is ignited and expands its energy against the firing head 31 which by this time has returned in position to receive it. As the firing head 29 on the near side continues to advance in the clockwise direction the abutment 36 will gradually swing inwardly while the abutment 35 correspondingly swings outwardly. The effect of the opening of the intake passage 53 by the abutment 36 is to admit a fresh charge, the inflowing of which occurs by the suction engendered in the chamber 40 by the advancing cam 29.

As soon as the abutment 36 has swung all the way in to a position corresponding with the dotted line position of the far abutment 38, the expulsion head 30 will be about ready to enter the erstwhile firing chamber 39 in the stator 1 and as the head 29 continues to draw a fresh charge into the chamber 40 on the left side the expulsion head 30 will serve to expel the residue of the previously exploded charge from the firing chamber 39 on the right side.

A still further progression of the expulsion head will result in a repetition of its first function in expelling the fresh charge from the chamber 40 and transferring it to the firing chamber on the far side. Thus it will be understood that the cam or head 30 performs two expelling functions, first the expulsion or transfer of a fresh charge from the near side of the engine to the far side, and second the expulsion of the residue of the burnt charge from the firing chamber 39 on the near side.

Consider again the position of the enlargements 27, 28 in Figure 10. The expulsion head 32 in this condition of the engine is about to expel the residue of a previously ignited charge from the far firing chamber 39 while the firing head 31 is performing its alternative function of drawing in a fresh charge into the far expulsion chamber 40. After the expulsion head 32 passes the abutment 38 in the manner previously described in connection with the abutment 36 and firing head 29 on the near side, it serves to expel from the far expulsion chamber 40 the charge previously drawn in by the firing chamber 31 while the latter soon assumes a position to receive the impact of a charge compressed by the expulsion head 30 in the firing chamber 39 on the far side and ignited in that chamber.

The foregoing description of the action of the rotor in respect to the conveniently termed near and far sides of the engine is reducible to the following tables, the first briefly explaining the actions occurring with the rotor in the approximate position shown in Figure 10.

| Working chamber 20 | Working chamber 21 |
|---|---|
| Firing head 29 driven forward in near chamber 39 by charge exploded in extension 43. | Firing head 31 drawing fresh charge into far chamber 40. |
| Expulsion head 30 compressing fresh charge in firing chamber extension 44. | Expulsion head 32 expelling residue of exploded charge from far firing chamber 39. |

Now consider the rotor as having revolved approximately 180 degrees in the clockwise direction. The action will be as follows:

| Working chamber 20 | Working chamber 21 |
|---|---|
| Firing head 29 drawing fresh charge into near chamber 40. | Firing head 31 driven forward by charge exploded in extension 44. |
| Expulsion head 30 about to expel residue from near firing chamber 39. | Expulsion head 32 compressing fresh charge in firing chamber extension 43. |

Since the guide cams 18, 19 are identical in size and position with the adjoining enlargements 27, 28 on the two sides of the engine, excepting for the fact that these parts are 180 degrees apart, it follows that there will be an identical correspondence of motions of the abutments 35, 36 in Figure 10 (taking the near abutments as an example) as well as the arms 60 (Figure 1) with the levers 94, 95 (Figure 8). Here it is the guide cam 18 and its cams which correspond with the heads 29, 30 (Figure 10) which cause the inward and outward swinging of the levers and the corresponding motions of the abutments. Most of the wear occurs on the periphery of the guide cam, the purpose of this cam being to relieve undue friction between the leading edges of the abutments against the rotor surface.

Notwithstanding the foregoing advantage of the guide cams it is entirely possible to operate the engine without them. The pairs of abutments may simply be connected by the yokes 58, 59 (Figures 1 and 6) in the manner herein contemplated and the levers 94, 95 with the contacting guide cams may be omitted.

While the construction and arrangement of the improved rotary engine is that of a generally preferred form, obviously modifications and changes may be made without departing from the spirit of the invention or the scope of the claims.

I claim:—

1. In a rotary engine, a stator having a base containing a pair of extensions of separate working chambers adapted to be formed within the stator, a slot in the base running in the direction of the extension chambers, having confronting inlet depressions, channels leading from said depressions to the extension chambers, and a head in which said extension chambers are continued, having cross-over ports communicating with said inlet depressions and having a rib fitting in the slot and defining a partition between said inlet depressions.

2. In a rotary engine, a stator having a base containing a slot having confronting inlet depressions, a rotor operable in the stator having means defining a pair of working chambers with which said depressions communicate, a head applicable to the base having a rib separating the inlet depressions and having cross-over ports connecting said depressions with the opposite working chambers, valves carried by the head controlling the cross-over ports, and springs embodied in the rib having engagement with the valves to tend to keep them seated.

3. In a rotary engine, a stator having an attached head with parts of a chamber opening into the interior of the stator, said chamber having channels on opposite sides, a rotor revoluble in the stator including circular flanges spaced a distance equal to the width of the chamber and running beneath said channels, and compression holding members situated in said channels, each being substantially triangular and joined on a bias, the broad base of one bearing on the adjoining flange there being a spring pressing on the other to maintain a tight connection at the various points of bearing on the flange and the sides of the respective channel.

4. In a rotary engine, the combination of a swingable abutment, lateral expansible packing members mounted in the sides of the abutment, and compression holding members situated at the sides of the abutment so that the packing members can expand thereagainst, said compression holding members being separate and movable in the plane of the sides of the abutment.

5. In a rotary engine having a stator with a chamber, a pair of substantially triangular compression members fitted together in the chamber with a bias joint, the base of one of the members being concaved, a rotor including a flange upon which the concaved base fits, and a spring carried by the stator, pressing against the base of the other member, and being adapted to take up any space tending to occur in the bias joint by the dragging of said flange along the concaved base.

6. In a rotary engine, an abutment composed of a core, cover strips, arcuate packing members extending along the sides of the abutment, filler plates situated between the core and cover strips to provide spaces for the packing members, and resilient means bearing against the filler plates and packing members tending to press said members outwardly.

7. In a rotary engine, an abutment comprising a core, cover strips, arcuate packing members extending along the sides of the abutment, resilient means tending to press said members outwardly, and filler plates situated between the core and cover strips to provide spaces for said packing members, said cover strips being notched to receive said resilient means.

8. In a rotary engine, a swingable abutment, arcuate packing members seated in opposite sides of the abutment and having overlapping lugs extending across the heel and leading edge of the abutment, resilient means tending to press said members outwardly in the lateral direction, and other resilient means pressing against the lugs in the direction of the leading edge, the lugs at the heel limiting the movement of said last resilient means.

9. In a rotary engine, a swingable abutment having a heel provided with a slot having portions thereof bevelled to provide knife edges on the sides and top of the heel, and a fibrous packing situated in the slot, said bevelled portions making room for the expansion of the outer part of the packing.

GEORGE H. BEUOY.